US012696180B2

(12) United States Patent (10) Patent No.: US 12,696,180 B2
Lin et al. (45) Date of Patent: Jul. 28, 2026

(54) HANDLING FOR CLOSED ACCESS GROUP (CAG) VALIDITY NO LONGER MET

(71) Applicant: MEDIATEK INC., Hsinchu (TW)

(72) Inventors: Yu-Hsin Lin, Hsinchu (TW); Yuan-Chieh Lin, Hsinchu (TW); Chia-Lin Lai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 294 days.

(21) Appl. No.: 18/537,911

(22) Filed: Dec. 13, 2023

(65) Prior Publication Data

US 2024/0236824 A1 Jul. 11, 2024

Related U.S. Application Data

(60) Provisional application No. 63/478,515, filed on Jan. 5, 2023.

(51) Int. Cl.
| | |
|---|---|
| *H04W 48/16* | (2009.01) |
| *H04W 48/18* | (2009.01) |
| *H04W 60/04* | (2009.01) |
| *H04W 84/04* | (2009.01) |

(52) U.S. Cl.
CPC ........... *H04W 48/16* (2013.01); *H04W 48/18* (2013.01); *H04W 60/04* (2013.01); *H04W 84/042* (2013.01)

(58) Field of Classification Search
CPC ..... H04W 48/16; H04W 48/18; H04W 60/04; H04W 84/042; H04W 4/06; H04W 4/90; H04W 12/08; H04W 12/61; H04W 48/02; H04L 63/101; H04L 63/108
See application file for complete search history.

(56) References Cited

U.S. PATENT DOCUMENTS

| | | | | |
|---|---|---|---|---|
| 11,706,626 | B2 * | 7/2023 | Tangudu | H04L 63/1458 726/7 |
| 2021/0385743 | A1 * | 12/2021 | Lin | H04W 48/20 |
| 2022/0312296 | A1 | 9/2022 | Chun | |
| 2022/0369206 | A1 * | 11/2022 | Talebi Fard | H04W 28/0289 |
| 2022/0377548 | A1 * | 11/2022 | Rajadurai | H04W 12/08 |

OTHER PUBLICATIONS

European Search Report, May 31, 2024, Germany.
SA WG2 Meeting #S2-151E, S2-2205152, May 16-20, 2022, Electronic Meeting (was S2-2204531), InterDigital, KI #4, New Sol: Supporting PNI-NPN as hosting network, Approval, Agenda 9.4, Work Item / Release: FS_eNPN_Ph2 1 Rel-18.

* cited by examiner

*Primary Examiner* — Richard T Torrente
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. In certain configurations, the UE maintains a closed access group (CAG) information list including an entry. The entry includes an allowed CAG list associated with a current PLMN. The allowed CAG list includes one or more CAG IDs. A first CAG ID is configured with a first time validity information including a first time period. The UE accesses the current PLMN via a current CAG cell supporting the first CAG ID when the first CAG ID is determined as authorized during the first time period. After the first time period, the UE determines that no CAG ID supported by the current CAG cell is currently authorized. The UE determines whether the UE may perform actions such as search for a suitable cell and/or applying a PLMN selection process.

20 Claims, 11 Drawing Sheets

400

800

```
CAG information list {                    ___ 810
  entry 1 {
    PLMN 111;
    Allowed CAG list {
      CAG 11;
      CAG 12;
      CAG 13;                              820
    }
  }
  entry 2 {
    PLMN 222;
    Allowed CAG list {
      CAG 21;
      CAG 22;                                        830
    }
    "indication that the UE is only allowed to access 5GS via CAG cells"
  }
  entry 3 {
    PLMN 333;
    enhanced Allowed CAG list {
      CAG 31, Jan-1 10:00-Jan-1 12:00;
      CAG 32, Jan-1 14:00-Jan-1 16:00;
    }
  }
}
```

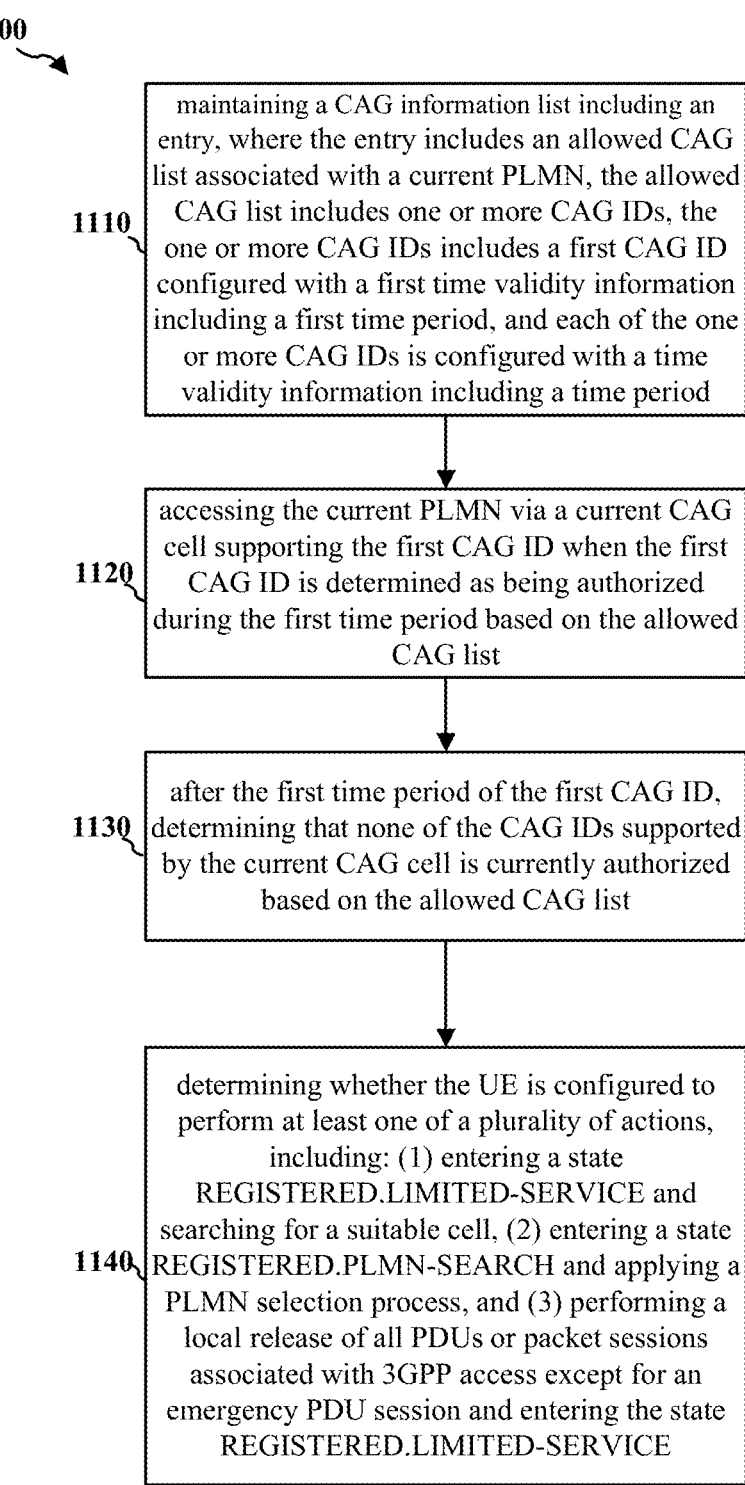

1110   maintaining a CAG information list including an entry, where the entry includes an allowed CAG list associated with a current PLMN, the allowed CAG list includes one or more CAG IDs, the one or more CAG IDs includes a first CAG ID configured with a first time validity information including a first time period, and each of the one or more CAG IDs is configured with a time validity information including a time period 1120   accessing the current PLMN via a current CAG cell supporting the first CAG ID when the first CAG ID is determined as being authorized during the first time period based on the allowed CAG list 1130   after the first time period of the first CAG ID, determining that none of the CAG IDs supported by the current CAG cell is currently authorized based on the allowed CAG list 1140   determining whether the UE is configured to perform at least one of a plurality of actions, including: (1) entering a state REGISTERED.LIMITED-SERVICE and searching for a suitable cell, (2) entering a state REGISTERED.PLMN-SEARCH and applying a PLMN selection process, and (3) performing a local release of all PDUs or packet sessions associated with 3GPP access except for an emergency PDU session and entering the state REGISTERED.LIMITED-SERVICE

FIG. 11

HANDLING FOR CLOSED ACCESS GROUP (CAG) VALIDITY NO LONGER MET

CROSS-REFERENCE TO RELATED APPLICATION(S)

This application claims the benefits of U.S. Provisional Application Ser. No. 63/478,515, entitled "HANDLING FOR CAG VALIDITY NO LONGER MET" and filed on Jan. 5, 2023, which is expressly incorporated by reference herein in their entirety.

BACKGROUND

Field

The present disclosure relates generally to communication systems, and more particularly, to techniques of methods and apparatuses for handling for closed access group (CAG) validity no longer met.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Other telecommunication standard examples may be 5G Advanced, beyond 5G, pre-6G, 6G, etc. Some aspects of 5G NR may be based on the 4G Long Term Evolution (LTE) standard. Some technologies associated with 5G Advanced, beyond 5G, pre-6G, 6G may build on 4G LTE or 5G NR. There exists a need for further improvements in 5G NR, 5G Advanced, beyond 5G, pre-6G, 6G technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE maintains a closed access group (CAG) information list including an entry. The entry includes an allowed CAG list associated with a current public land mobile network (PLMN). The allowed CAG list includes one or more CAG identifiers (IDs). The one or more CAG IDs includes a first CAG ID configured with a first time validity information including a first time period. Each of the one or more CAG IDs is configured with a time validity information including a time period. The UE accesses the current PLMN via a current CAG cell supporting the first CAG ID when the first CAG ID is determined as being authorized during the first time period based on the allowed CAG list. After the first time period of the first CAG ID, the UE determines that none of the CAG IDs supported by the current CAG cell is currently authorized based on the allowed CAG list. The UE determines whether the UE is configured to perform at least one of a plurality of actions, including: (1) entering a state REGISTERED.LIMITED-SERVICE and searching for a suitable cell, (2) entering a state REGISTERED.PLMN-SEARCH and applying a PLMN selection process, and (3) performing a local release of all packet data units (PDUs) or packet sessions associated with 3GPP access except for an emergency PDU or packet session and entering the state REGISTERED.LIMITED-SERVICE.

In certain configurations, each of the one or more CAG ID is determined as being authorized based on the allowed CAG list when the time period of the time validity information of the each of the one or more CAG ID matches a current time of the UE.

In certain configurations, the UE determines whether the UE is configured to perform at least one of the actions based on one or more of: (a) whether the entry includes an indication that the UE is only allowed to access a fifth-generation system (5GS) or a sixth-generation system (6GS) via CAG cells, (b) whether the one or more CAG IDs are authorized based on the allowed CAG list, and (c) whether the UE has the emergency PDU or packet session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating an example CAG information list.

FIG. 11 is a flow chart of a method (process) of wireless communication of a UE.

DETAILED DESCRIPTION

Figure 1:
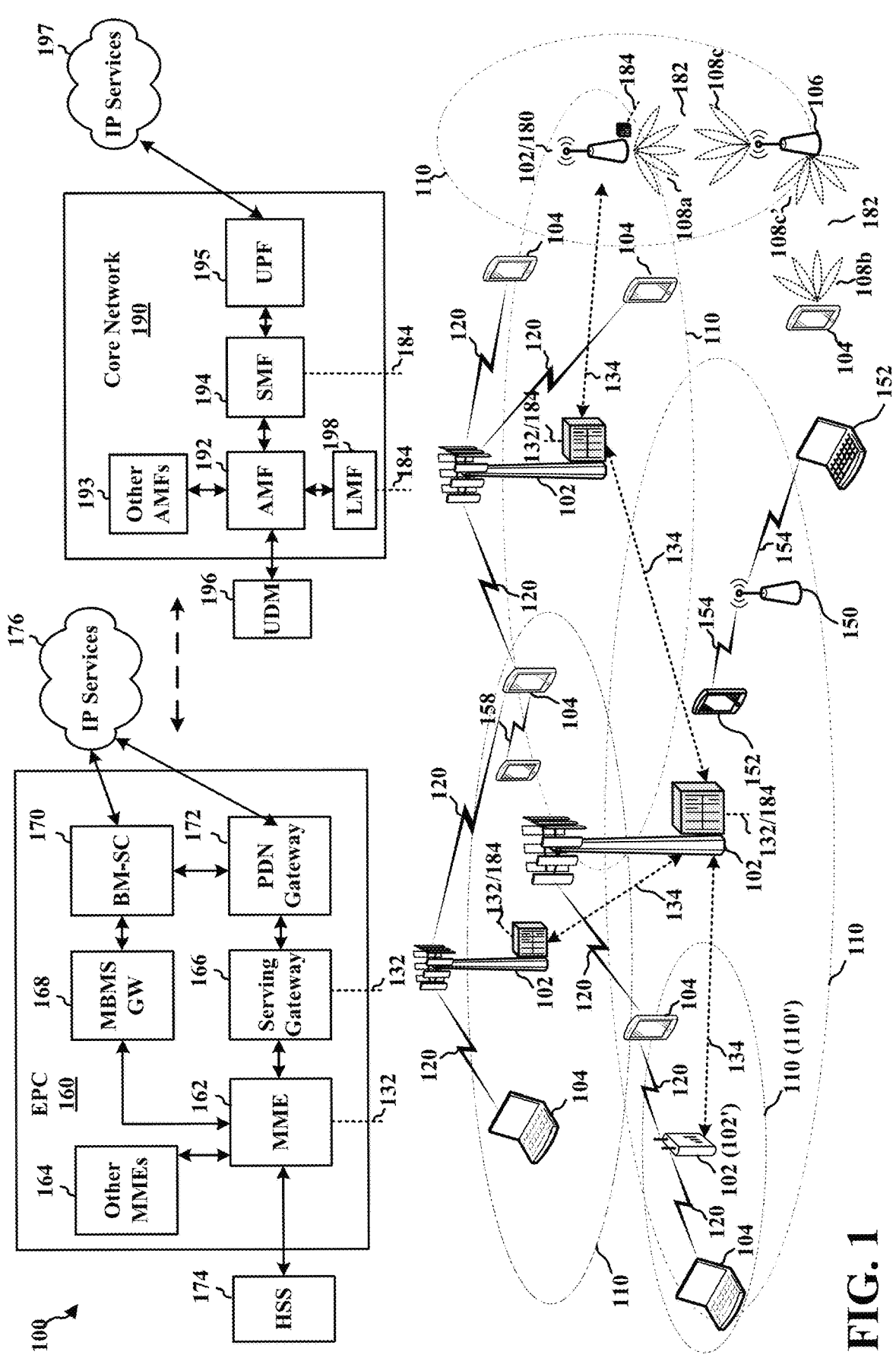
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace. RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The base station 106 may perform beamformed signals transmission with the UE 104 in one or more beam directions (108*c*, 108*c*'). The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
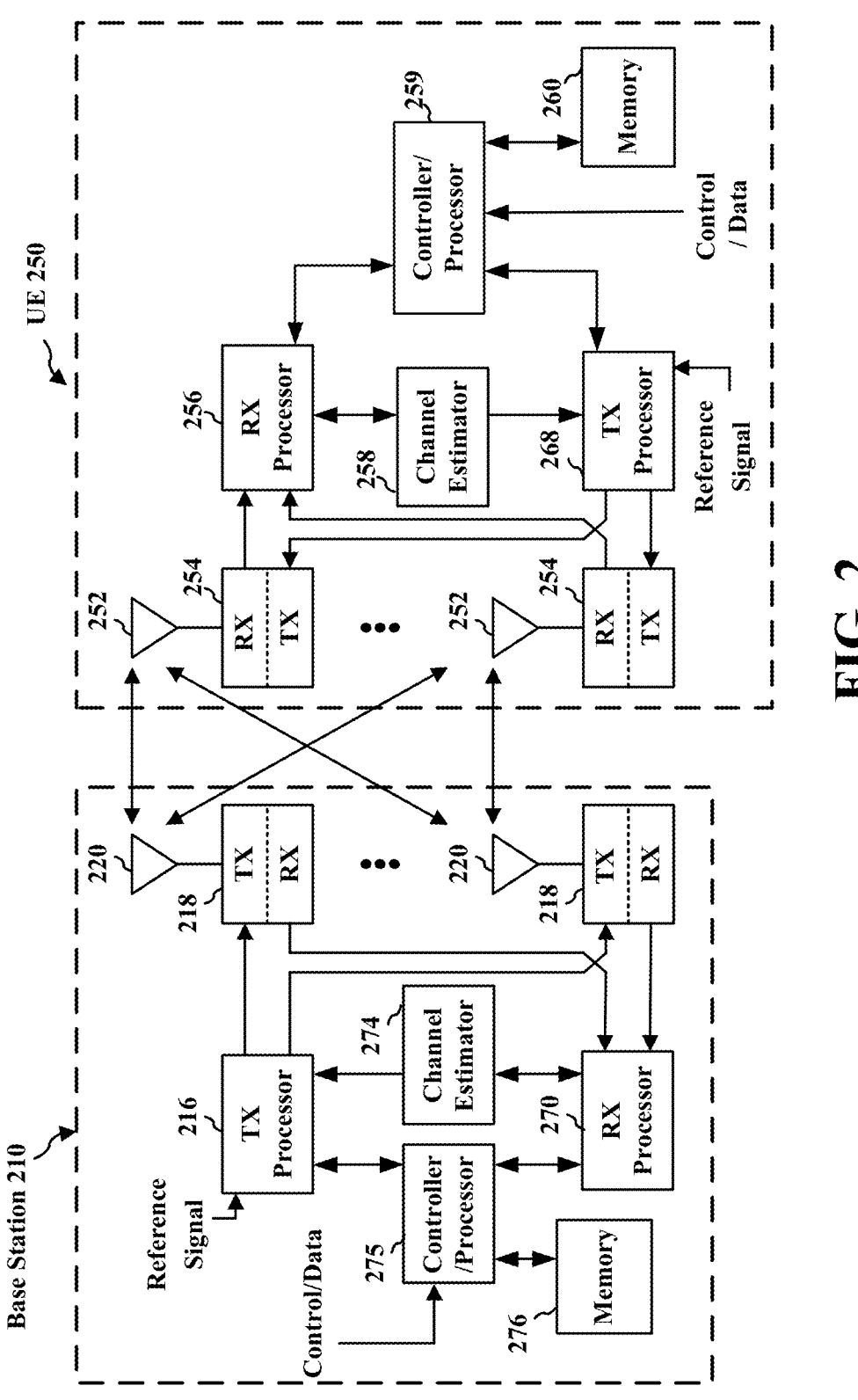
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer protocol data units (PDUs), error correction through ARQ, concatenation, segmentation, and reassembly of RLC service data units (SDUs), re-segmentation of RLC data PDUs, and reordering of RLC data PDUs: and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs: and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
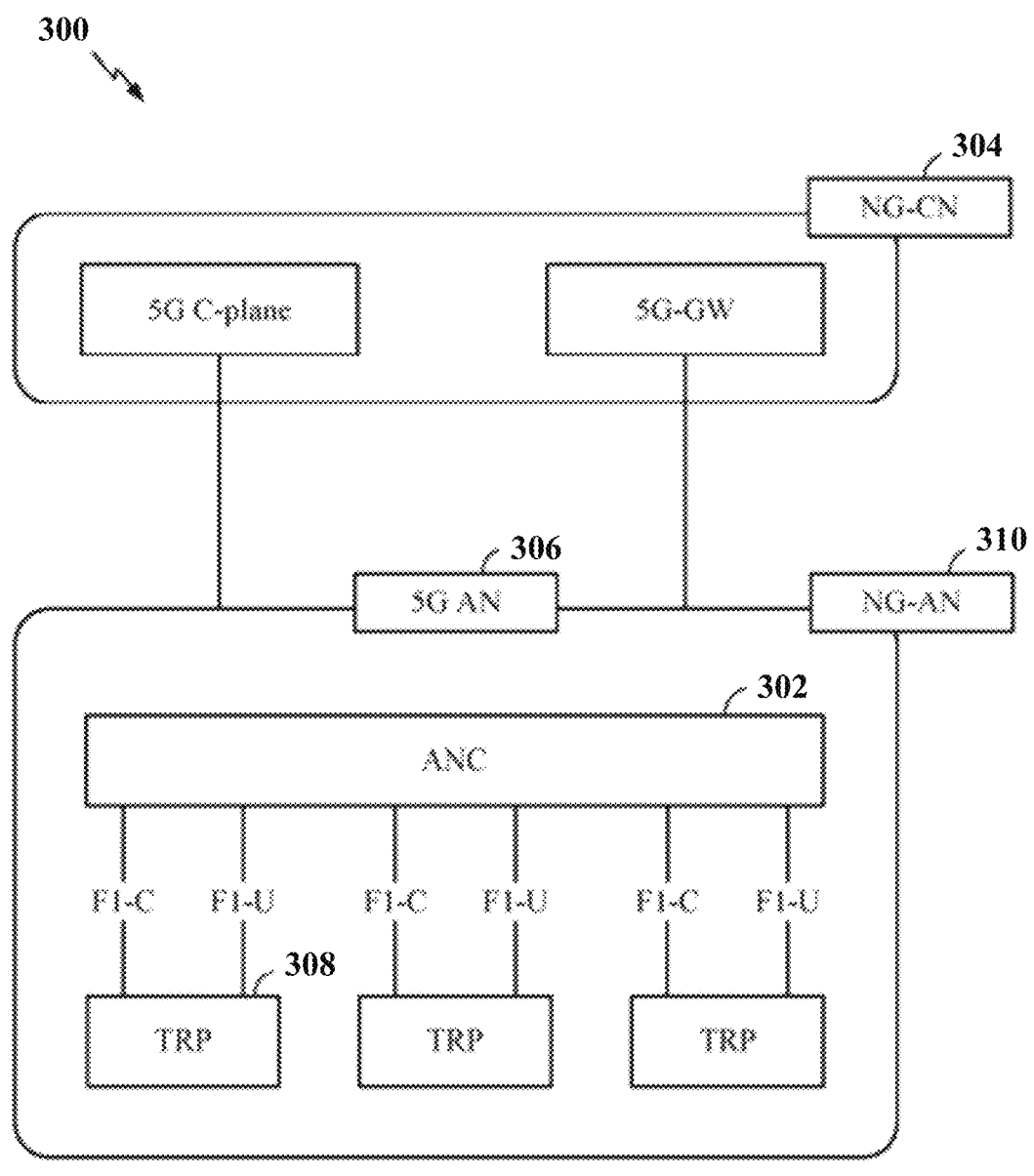
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell." The ANC may associate with one or more TRPs 308 via F1 control plan protocol (F1-C)/F1 user plan protocol (F1-U).

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
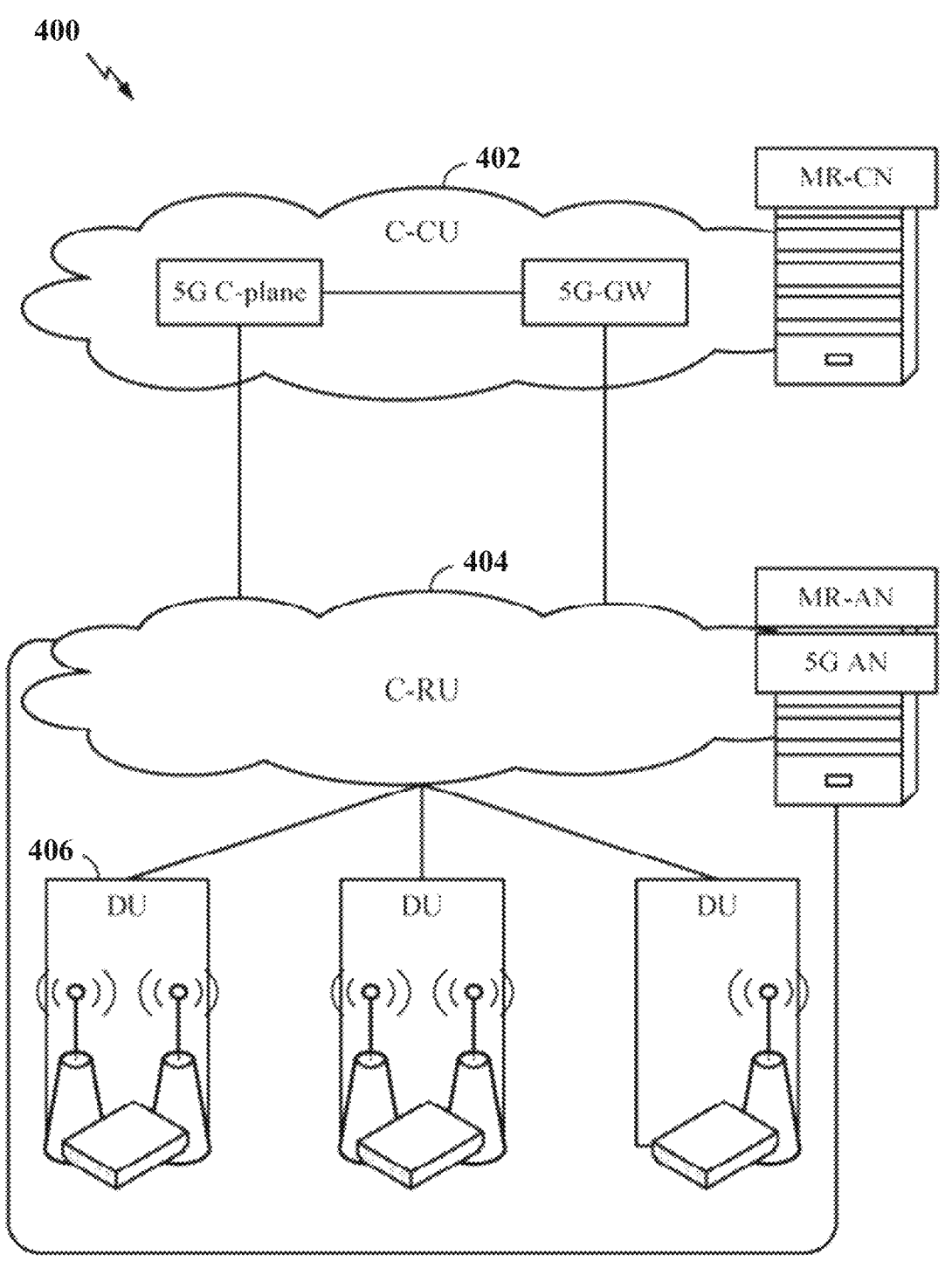
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
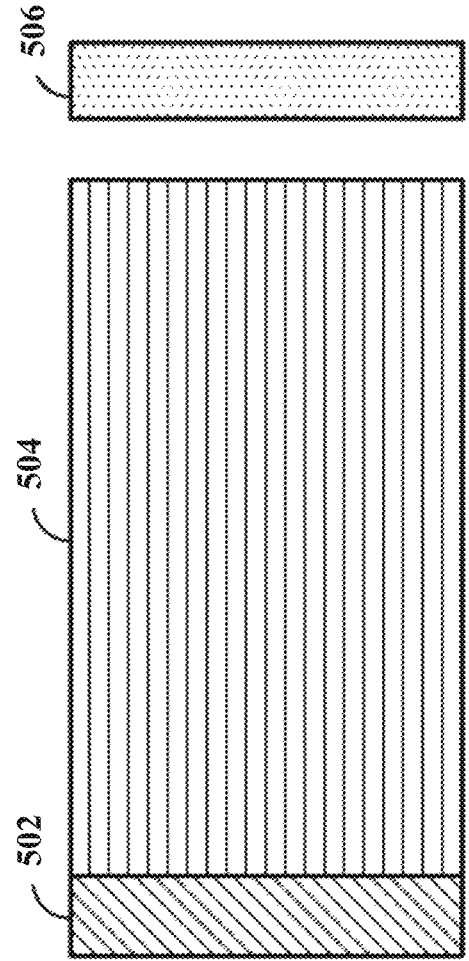
FIG. 5 is a diagram showing an example of a DL-centric slot.
Figure 5:
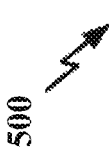
Figure 5:
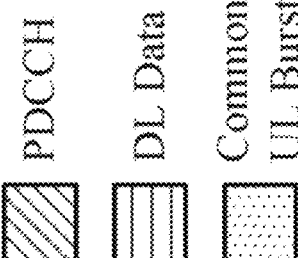

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
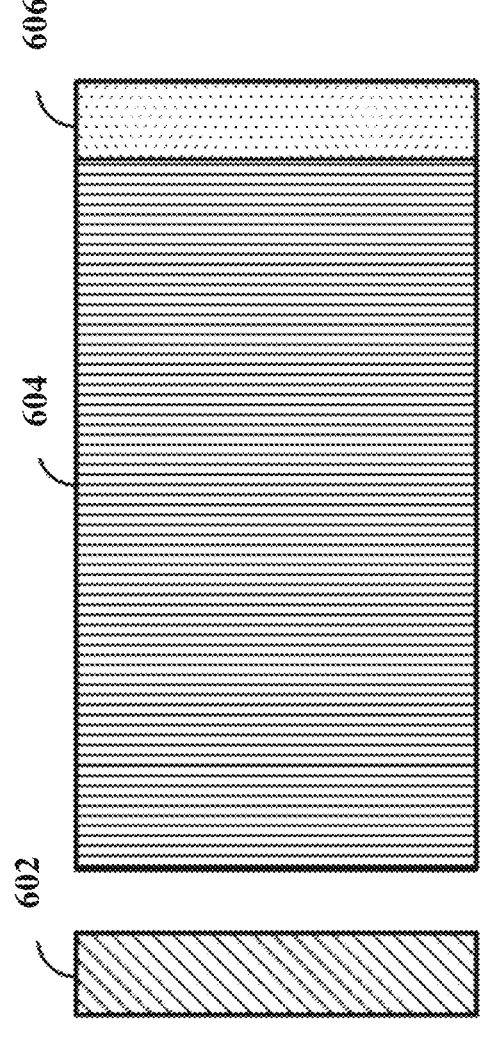
FIG. 6 is a diagram showing an example of an UL-centric slot.
Figure 6:
Figure 6:
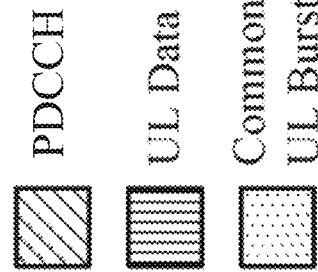

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In certain configurations, the UE may be required to execute certain events, for example, an OS upgrade procedure, silent rest at modem, or binary updates such as modem software updates. In this case, once the UE has downloaded the binary, the time when the UE performs the upgrade is left for the UE implementation. When the UE becomes unavailable to execute such events, it can affect critical operations of an application server if the availability of the UE is not correctly configured during an unavailability period (i.e., a period of time during which the UE is not available) as described in 3GPP Technical Specification (TS). Thus, there is a need for coordination between the UE and operator/application function.

In certain configurations, 5G system (5GS) or 6G system (6GS) deploys a non-public network (NPN) for non-public use. A public network integrated (PNI) NPN is a NPN made available via PLMNs, e.g., by means of dedicated data network names (DNNs), or by one or more Network Slice instances allocated for the NPN. When a PNI-NPN is made available via a PLMN, then the UE shall have a subscription for the PLMN in order to access PNI-NPN. As network slicing does not enable the possibility to prevent UEs from trying to access the network in areas which the UEs are not allowed to use the Network Slice allocated for the NPN, closed access groups (CAGs) can be optionally used in order to prevent the UEs that are not allowed to access a PNI-NPN from accessing the PNI-NPN.

A CAG identifies a group of subscribers who are permitted to access one or more CAG cells associated with the CAG. The CAG is used for the PNI-NPNs to prevent UEs, which are not allowed to access the NPN via the associated cells, from automatically selecting and accessing the associated cells. CAG is used for access control, e.g., authorization at cell selection and configured in the subscription as part of the Mobility Restrictions, i.e., independent from any Single Network Slice Selection Assistance Information (S-NSSAI).

A CAG is identified by a CAG identifier (CAG ID), which is unique within the scope of a PLMN (defined by a corresponding PLMN ID). A CAG cell broadcasts one or more CAG IDs per PLMN. In certain configurations, a CAG cell may in addition broadcast a human-readable network name (HRNN) per CAG ID.

Figure 7:
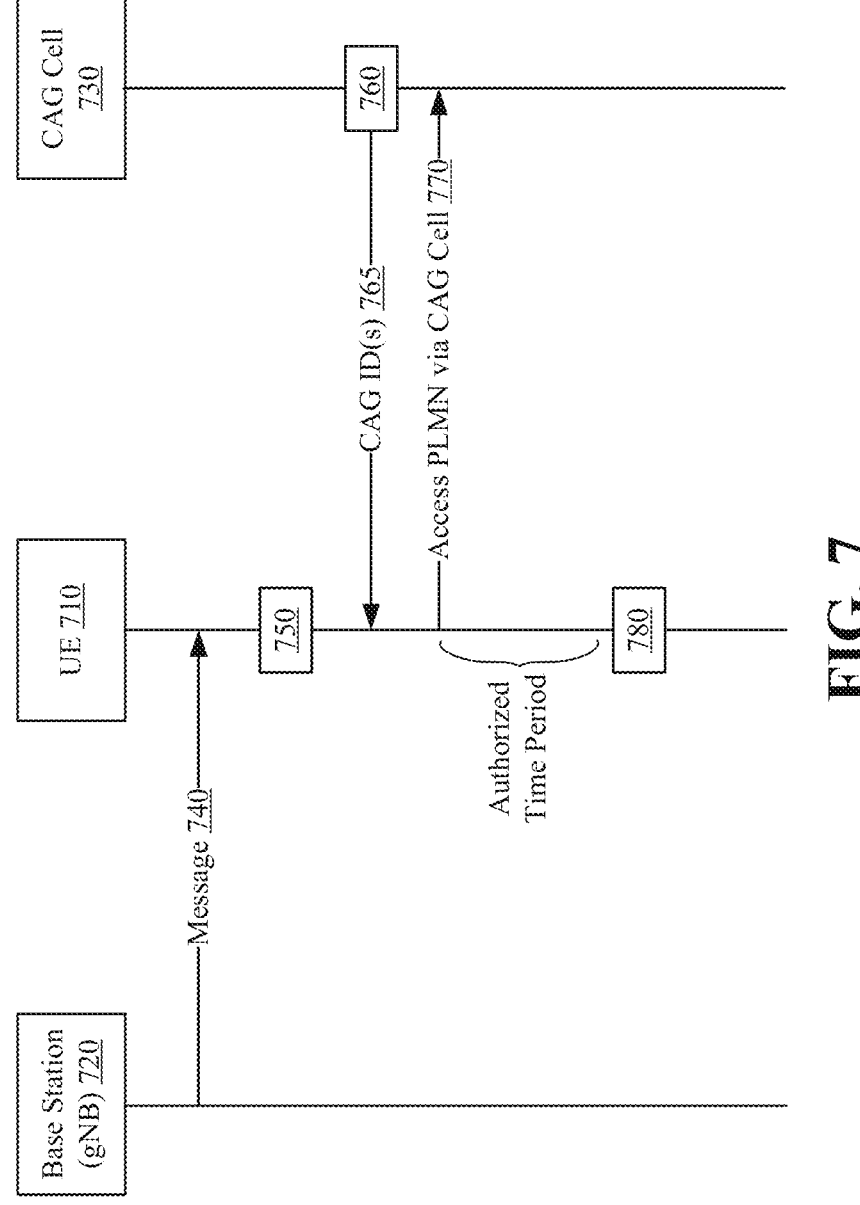
FIG. 7 is a diagram illustrating an example procedure of a UE accessing a CAG cell.
Figure 7:

FIG. 7 is a diagram illustrating an example procedure 700 between a UE and a base station. Specifically, the UE 710 may be a UE that supports CAG as indicated as part of the UE 5GMM Core Network Capability, and the UE 710 may be pre-configured (or re-configured) by the base station 720 with corresponding CAG information in order to use the CAG, i.e., accessing the PLMN via the CAG cell 730.

As shown in FIG. 7, when the UE 710 is registered to the base station 720, the base station 720 of a PLMN sends a CAG related configuration by a message 740 to the UE 710. Upon receiving the message 740, the UE 710 may store the CAG related configuration in the message 740, such that the UE 710 may later access a corresponding PLMN via a CAG cell supporting a CAG ID indicated by the CAG related configuration in the message 740. In certain configurations, the message 740 may include a CAG information list, which include zero, one or more entries, and each entry includes: (a) a PLMN ID indicating a corresponding PLMN, (b) an allowed CAG list, which include zero, one or more CAG IDs, and (c) an optional CAG-only indication. The optional CAG-only indication (also referred to as an "indication that the MS is only allowed to access 5GS via CAG cells") is an indication that the UE 710 is only allowed to access 5GS (i.e., the PLMN) via CAG cells (e.g., the CAG cell 730). The CAG information list provisioned by the network, if available, is stored in the non-volatile memory in the UE.

In certain configurations, for each entry of the CAG information list, a CAG ID in the allowed CAG list may include or be associated to additional criteria information. Examples of the criteria information may include at least one of: time criteria, location criteria and other criteria. For example, a CAG ID may be configured with time validity information to indicate the time criteria (e.g., an authorized time period). In this case, the CAG ID may be considered authorized when the time criteria indicated by the time validity information is met (e.g., a current time of the UE 710 matches with the authorized time period indicated by time validity information), and not authorized when the time criteria is no longer met (e.g., the current time does not match with the authorized time period).

FIG. 8 is a diagram illustrating an example CAG information list. As shown in FIG. 8, the CAG information list 800 include 3 entries, and each entry includes a corresponding PLMN ID 810 and an allowed CAG list 820. For entry 1, the corresponding PLMN ID 810 indicates PLMN 111, and the allowed CAG list 820 includes 3 CAG IDs, including CAG 11, CAG 12 and CAG 13. For entry 2, the corresponding PLMN ID 810 indicates PLMN 222, and the allowed CAG list 820 includes 2 CAG IDs, including CAG 21 and CAG 22. Further, the entry 2 also includes a CAG-only indication 830 (i.e., indication that the UE is only allowed to access 5GS via CAG cells). For entry 3, the corresponding PLMN ID 810 indicates PLMN 333, and the allowed CAG list 820 includes 2 CAG IDs, including CAG 31 and CAG 32. Further, the allowed CAG list 820 for the entry 3 is an enhanced allowed CAG list, in which each CAG ID may have corresponding time validity information. For example, CAG 31 is configured with the time validity information that indicates the authorized time period of January-1 10:00 to January-1 12:00, indicating that the UE may access the PLMN 333 via the CAG cell supporting CAG 31 in this authorized time period (January-1 10:00 to January-1 12:00). Similarly, CAG 32 is configured with the time validity information that indicates the authorized time period of January-1 14:00 to January-1 16:00, indicating that the UE may access the PLMN 333 via the CAG cell supporting CAG 32 in this authorized time period (January-1 14:00 to January-1 16:00).

In certain configurations, examples of the PLMN may include a home PLMN (HPLMN), an equivalent PLMN (EHPLMN) or other higher priority PLMN. The HPLMN may configure or re-configure the UE with the CAG information in the CAG information list 800 using the UE Configuration Update procedure for access and mobility management related. Further, the CAG information list may be provided by the HPLMN on a per PLMN basis. For example, in a PLMN, the UE may consider only the CAG information provided for this PLMN. In certain configurations, the UE may store the latest available CAG information for every PLMN for which it is provided, and keep the CAG information stored when the UE is de-registered or switched off.

Figure 9:
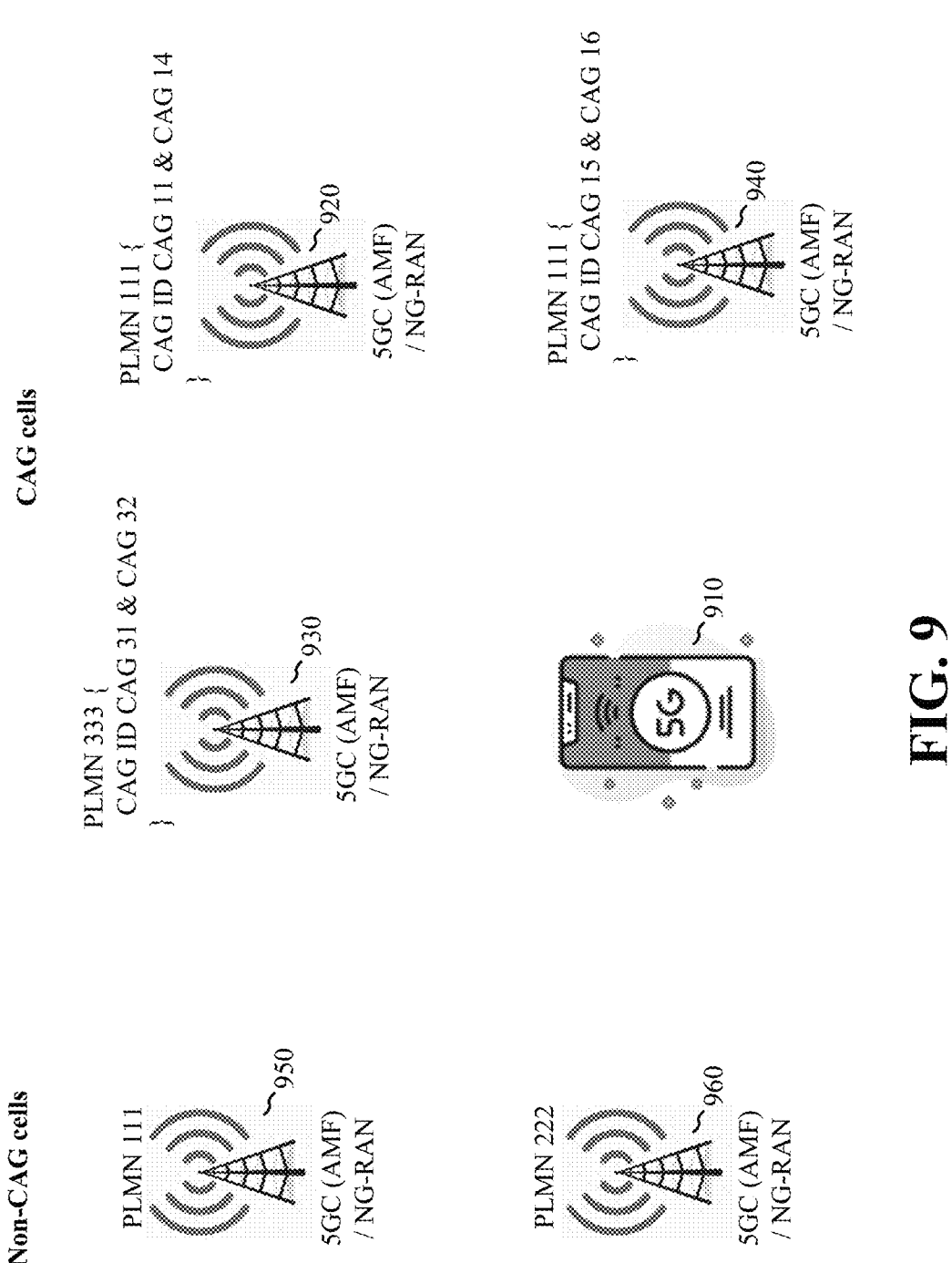
FIG. 9 is a diagram illustrating an example procedure of a UE accessing a plurality of PLMNs via CAG cells and non-CAG cells.

FIG. 9 is a diagram illustrating an example procedure of a UE accessing a plurality of PLMNs via CAG cells and non-CAG cells. The UE 910 (i.e., the UE 710) may be configured with the CAG information list 800 as shown in FIG. 8. For the two CAG cells 920 and 940 that are configured with PLMN 111, the UE 910 may access the PLMN 111 via the CAG cell 920, which has two CAG IDs, including CAG 11 (matching with one of the 3 CAG IDs of the entry 1 of the CAG information list 800) and CAG 15. However, the UE 910 cannot access the PLMN 111 via the CAG cell 940, which has two CAG IDs, including CAG 14 and CAG 15, and none of the two CAG IDs matches with the 3 CAG IDs of the entry 1 of the CAG information list 800. If the UE 910 attempts to access the PLMN 111 via the CAG cell 940, the access request will be denied.

For the CAG cell 930 (i.e., CAG cell 730) that is configured with PLMN 333, the UE 910 may access the PLMN 333 via the CAG cell 930, which has two CAG IDS, including CAG 31 and CAG 32 (both matching with the 2 CAG IDs of the entry 3 of the CAG information list 800) when the time criteria indicated by the corresponding time validity information for each CAG ID is met. For example, the UE 910 may access PLMN 333 via the CAG cell 930 with CAG 31 during the authorized time period of January-1 10:00 to January-1 12:00, and the UE 910 may access PLMN 333 via the CAG cell 930 with CAG 32 during the authorized time period of January-1 14:00 to January-1 16:00. However, the UE 910 cannot access the CAG cell 930 at a time that is not within the two authorized time periods.

For the two non-CAG cells 950 and 960, the UE 910 may access PLMN 111 via the non-CAG cell 950 because the entry 1 does not include the CAG-only indication, thus indicating that the UE 910 may be allowed to access PLMN 111 via non-CAG cells. However, the UE 910 cannot access PLMN 222 via the non-CAG cell 960 because the entry 2 includes the CAG-only indication, thus indicating that the UE 910 is only allowed to access PLMN 222 via CAG cells.

Referring back to FIG. 7, assuming that the CAG related configuration in the message 740 includes the CAG information list 800 as shown in FIG. 8, which includes the entry 3 having the CAG IDs with the time validity information. At operation 750, the CAG cell 730 (i.e., CAG cell 930) supporting one or both of the CAG IDs within the PLMN 333 broadcasts the CAG IDs 765, including CAG 31 and CAG 32. When the current time of the UE 710 matches with the authorized time period of CAG 31 (e.g., January-1 at 10:00), at operation 770, the UE 710 may start accessing PLMN 333 via the CAG cell 730 with CAG 31. The access may continue throughout the authorized time period with CAG, e.g., on January-1 from 10:00 to 12:00. In one embodiment, the UE 710 may set a timer for the authorized time period, such that the UE 710 knows the end of the authorized time period when the timer expires. In another embodiment, CAG 31 becomes not authorized based on "the allowed CAG list" (e.g., time validity information no longer matches UE's current time). At operation 780, after the authorized time period (e.g., January-1 at 12:01), the UE 710 may perform corresponding actions as the time criteria for the CAG 31 is no longer met. It should be noted that, when the CAG cell 730 is no longer authorized, the corresponding UE behavior/action at operation 780 is not defined in the 3GPP technical specification. Thus, it is required to provide a procedure for the UE 710 to follow at operation 780, such that the UE does not merely stay on the CAG cell 730 which is no longer suitable, without trying to search for another suitable cell or another PLMN.

Figure 10:
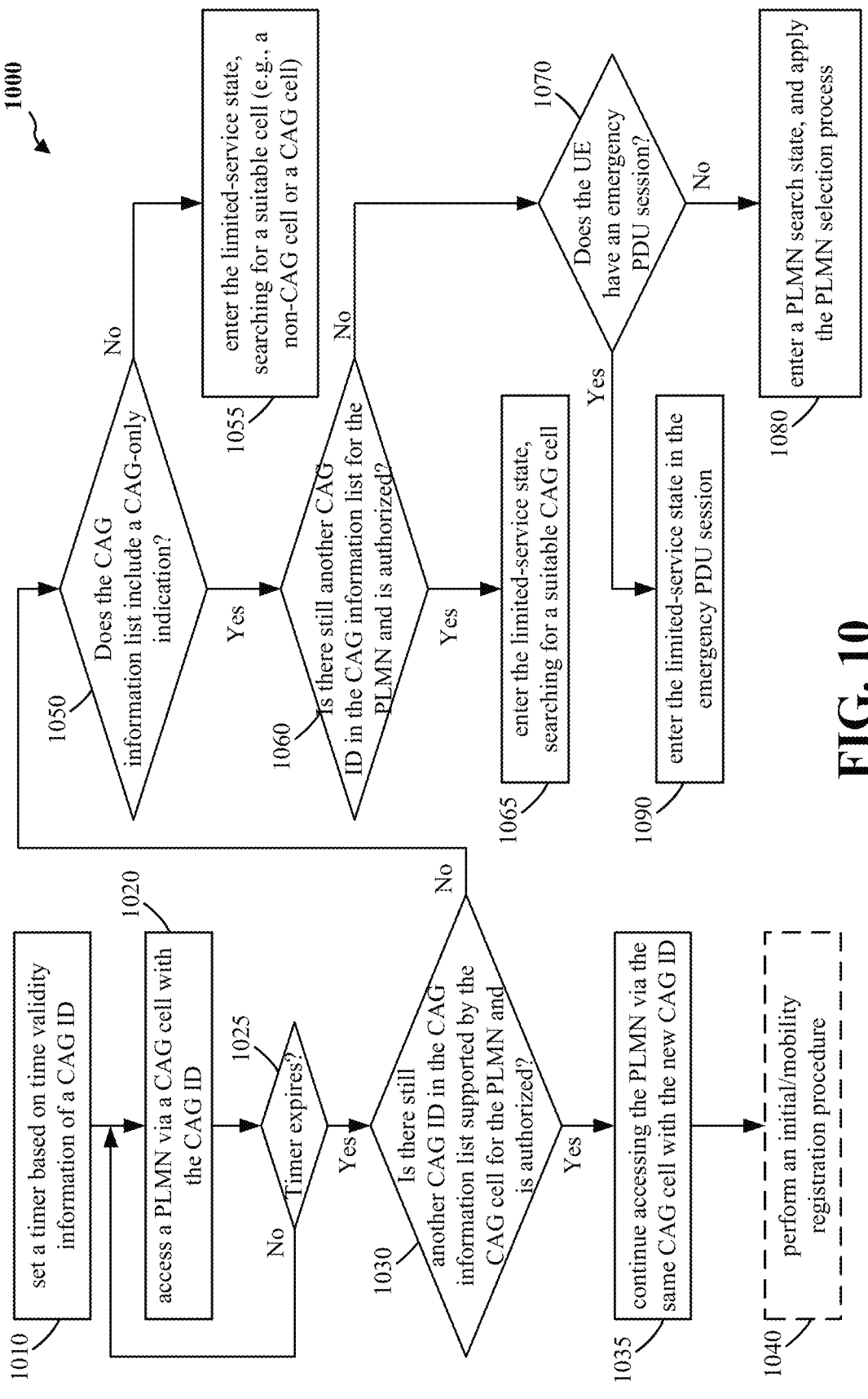
FIG. 10 is a flow chart showing an example procedure of a UE after the CAG ID becomes not authorized.

FIG. 10 is a flow chart showing an example procedure of a UE after the CAG ID becomes not authorized. The procedure 1000 may be performed by a UE (e.g., the UE 710 or the UE 910), which has stored (e.g., previously received)

a CAG information list (e.g., the CAG information list 800). When the UE intends to access a PLMN via a CAG cell (e.g., the CAG cell 930) with a CAG ID that is configured with time validity information, at operation 1010, the UE optionally may set a timer based on the time validity information. The timer is used for the UE to know when the authorized time period indicated by the time validity information expires. Upon setting the timer, at operation 1020, the UE may start accessing the PLMN via the CAG cell with the CAG ID. At operation 1025, the UE determines whether the timer expires. If the timer is not expired, the UE may return to operation 1020 to continue accessing the PLMN via the CAG cell.

When the timer expires, the UE knows that the time criteria for the CAG ID is no longer met, i.e., the CAG ID becomes not authorized. At operation 1030, the UE determines whether there is still another CAG ID in the CAG information list for the PLMN supported by the CAG cell and is authorized. Specifically, the new CAG ID is authorized when (a) the new CAG ID is configured with corresponding time validity information indicating a corresponding authorized time period, and a current time matches with the corresponding authorized time period: or (b) the new CAG ID is not configured with the time validity information. If the UE determines that there is such a new CAG ID supported by the same CAG cell and is authorized, at operation 1035, the UE may continue accessing the PLMN via the same CAG cell with the new CAG ID. Optionally, at operation 1040, the UE may perform an initial/mobility registration procedure with the new CAG ID.

On the other hand, if the UE determines that there is no (other) CAG ID supported by the same CAG cell and is authorized, at operation 1050, the UE determines whether the CAG information list includes a CAG-only indication, i.e., an indication that the UE is only allowed to access 5GS (i.e., the PLMN) via CAG cells. If the CAG information list does not include the CAG-only indication, the UE determines that it may access the PLMN via both CAG cells and non-CAG cells. At operation 1055, the UE enters a limited-service state, e.g., the state (5GMM-(DE)REGISTERED.) LIMITED-SERVICE, searching for a suitable CAG or non-CAG cell. Specifically, the suitable cell may be a non-CAG cell, or may be another CAG cell which broadcasts the CAG ID(s) included in the CAG information list of the UE. Once the UE finds a suitable cell, the UE may continue accessing the PLMN via the suitable cell.

If the CAG information list includes the CAG-only indication, the UE determines that it may access the PLMN only via CAG cells and cannot access the same PLMN via non-CAG cells. At operation 1060, the UE determines whether there is still another CAG ID in the CAG information list for the PLMN and is authorized. The new CAG ID, if exists, may not be supported by the same CAG cell, which means that the UE may have to search for a new CAG cell supporting the new CAG ID. Specifically, the new CAG ID is authorized when (a) the new CAG ID is configured with corresponding time validity information indicating a corresponding authorized time period, and a current time matches with the corresponding authorized time period: or (b) the new CAG ID is not configured with the time validity information. If the UE determines that there is such a new CAG ID and is authorized, at operation 1065, the UE may enter a limited-service state, e.g., the state (5GMM-(DE) REGISTERED.)LIMITED-SERVICE, searching for a suitable CAG cell supporting the new CAG ID.

On the other hand, the UE may determine that there is no (other) CAG ID in the CAG information list for the PLMN that is authorized. For example, the entry for the current PLMN in the CAG information list may include no other CAG ID. Alternatively, the entry for the current PLMN in the CAG information list may include other CAG ID(s), but each CAG ID in the entry is not authorized (e.g., each CAG ID is configured with corresponding time validity information indicating a corresponding authorized time period, and the current time does not match with the corresponding authorized time period). In this case, at operation 1070, the UE may determine whether the UE has an emergency PDU session. If the UE does not have the emergency PDU session, the UE cannot stay in the PLMN. At operation 1080, the UE may enter a PLMN search state, e.g., the state (5GMM-(DE)REGISTERED.)PLMN-SEARCH, and apply the network selection process (e.g., PLMN selection process), in order to search for another network or another PLMN. On the other hand, if the UE has the emergency PDU session, the UE may stay in the PLMN using the emergency PDU session. At operation 1090, the UE may enter a limited-service state, e.g., the state (5GMM-(DE)REGIS-TERED.)LIMITED-SERVICE, in the emergency PDU session. The UE may also release all PDU sessions associated with 3GPP access locally, except for the emergency PDU session.

FIG. 11 is a flow chart of a method (process) of wireless communication of a UE. The method may be performed by a UE, e.g., the UE 710. At operation 1110, the UE maintains a CAG information list including an entry. The entry includes an allowed CAG list associated with a current PLMN. The allowed CAG list includes one or more CAG IDs. The one or more CAG IDs includes a first CAG ID configured with a first time validity information including a first time period. Each of the one or more CAG IDs is configured with a time validity information including a time period. At operation 1120, the UE accesses the current PLMN via a current CAG cell supporting the first CAG ID when the first CAG ID is determined as being authorized during the first time period based on the allowed CAG list. At operation 1130, after the first time period of the first CAG ID, the UE determines that none of the CAG IDs supported by the current CAG cell is currently authorized based on the allowed CAG list. At operation 1140, the UE determines whether the UE is configured to perform at least one of a plurality of actions, including: (1) entering a state REGIS-TERED. LIMITED-SERVICE and searching for a suitable cell. (2) entering a state REGISTERED.PLMN-SEARCH and applying a PLMN selection process, and (3) performing a local release of all PDU or packet sessions associated with 3GPP access except for an emergency PDU or packet session and entering the state REGISTERED.LIMITED-SERVICE.

In certain configurations, a second CAG ID of the one or more CAG ID is determined as being authorized based on the allowed CAG list when a second time period of a second time validity information of the second CAG ID of the one or more CAG ID matches a current time of the UE.

In certain configurations, the UE determines whether the UE is configured to perform at least one of the actions based on one or more of: (a) whether the entry includes an indication that the UE is only allowed to access a fifth-generation system (5GS) or a sixth-generation system (6GS) via CAG cells, (b) whether the one or more CAG IDs are authorized based on the allowed CAG list, and (c) whether the UE has the emergency PDU or packet session.

In one embodiment, the UE is configured to enter the state REGISTERED. LIMITED-SERVICE and search for a suitable cell when the entry does not include the indication that the UE is only allowed to access the 5GS or the 6GS via the CAG cells.

In one embodiment, the UE is configured to enter the state REGISTERED. LIMITED-SERVICE and search for a suitable cell when the entry includes the indication that the UE is only allowed to access the 5GS or the 6GS via the CAG cells and at least one or more of the one or more CAG IDs are authorized based on the allowed CAG list.

In one embodiment, the UE is configured to enter the state REGISTERED.PLMN-SEARCH and apply the PLMN selection process when the entry includes the indication that the UE is only allowed to access the 5GS or the 6GS via the CAG cells, none of the one or more CAG-IDs is authorized based on the allowed CAG list, and the UE does not have the emergency PDU or packet session.

In one embodiment, the UE is configured to perform the local release of all PDU or packet sessions associated with 3GPP access except for the emergency PDU or packet session and enter the state REGISTERED.LIMITED-SER-VICE when the entry includes the indication that the UE is only allowed to access the 5GS or the 6GS via the CAG cells, none of the one or more CAG-IDs is authorized based on the allowed CAG list, and the UE has the emergency PDU or packet session.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

maintaining a closed access group (CAG) information list including an entry, wherein the entry includes an allowed CAG list associated with a current public land mobile network (PLMN), the allowed CAG list includes one or more CAG identifiers (IDs), the one or more CAG IDs includes a first CAG ID configured with a first time validity information including a first time period, and each of the one or more CAG IDs is configured with a time validity information including a time period;

accessing the current PLMN via a current CAG cell supporting the first CAG ID when the first CAG ID is determined as being authorized during the first time period based on the allowed CAG list;

checking whether the UE is authorized based on the first time validity information;

after the first time period of the first CAG ID, determining that none of the CAG IDs supported by the current CAG cell is currently authorized based on the allowed CAG list in response to an event that the UE becomes not authorized; and determining whether the UE is configured to perform at least one of a plurality of actions, including:

(1) entering a state REGISTERED.LIMITED-SER-VICE and searching for a suitable cell, (2) entering a state REGISTERED.PLMN-SEARCH and applying a PLMN selection process, and (3) performing a local release of all packet data units (PDUs) or packet sessions associated with 3GPP access except for an emergency PDU or packet session and entering the state REGISTERED.LIM-ITED-SERVICE.

2. The method of claim 1, wherein a second CAG ID of the one or more CAG ID is determined as being authorized based on the allowed CAG list when a second time period of a second time validity information of the second CAG ID of the one or more CAG ID matches a current time of the UE.

3. The method of claim 1, wherein the determining whether the UE is configured to perform at least one of the actions is based on one or more of:

(a) whether the entry includes an indication that the UE is only allowed to access a fifth- generation system (5GS) or a sixth-generation system (6GS) via CAG cells, (b) whether the one or more CAG IDs are authorized based on the allowed CAG list, and (c) whether the UE has the emergency PDU or packet session.

4. The method of claim 3, wherein the UE is configured to enter the state REGISTERED.LIMITED-SERVICE and search for a suitable cell when the entry does not include the indication that the UE is only allowed to access the 5GS or the 6GS via the CAG cells.

5. The method of claim 3, wherein the UE is configured to enter the state REGISTERED.LIMITED-SERVICE and search for a suitable cell when the entry includes the indication that the UE is only allowed to access the 5GS or the 6GS via the CAG cells and at least one of the one or more CAG IDs are authorized based on the allowed CAG list.

6. The method of claim 3, wherein the UE is configured to enter the state REGISTERED.PLMN-SEARCH and apply the PLMN selection process when the entry includes the indication that the UE is only allowed to access the 5GS or the 6GS via the CAG cells, none of the one or more CAG-IDs is authorized based on the allowed CAG list, and the UE does not have the emergency PDU or packet session.

7. The method of claim 3, wherein the UE is configured to perform the local release of all PDU or packet sessions associated with 3GPP access except for the emergency PDU or packet session and enter the state REGISTERED.LIM-ITED-SERVICE when the entry includes the indication that the UE is only allowed to access the 5GS or the 6GS via the CAG cells, none of the one or more CAG-IDs is authorized based on the allowed CAG list, and the UE has the emergency PDU or packet session.

8. The method of claim 1, wherein the entry further includes a PLMN identifier for identifying the current PLMN, wherein the first time validity information is configured as part of the first CAG ID in the allowed CAG list of the entry in the CAG information list, and the CAG information list including the first time validity information is stored in a non-volatile memory of the UE.

9. An apparatus for wireless communication, the apparatus being a user equipment (UE), comprising:
  a memory; and
  at least one processor coupled to the memory, the processor being configured to:
  maintain a closed access group (CAG) information list including an entry, wherein the entry includes an allowed CAG list associated with a current public land mobile network (PLMN), the allowed CAG list includes one or more CAG identifiers (IDs), the one or more CAG IDs includes a first CAG ID configured with a first time validity information including a first time period, and each of the one or more CAG IDs is configured with a time validity information including a time period;
  access the current PLMN via a current CAG cell supporting the first CAG ID when the first CAG ID is determined as being authorized during the first time period based on the allowed CAG list;
  check whether the UE is authorized based on the first time validity information;
  after the first time period of the first CAG ID, determine that none of the CAG IDs supported by the current CAG cell is currently authorized based on the allowed CAG list in response to an event that the UE becomes not authorized; and
  determine whether the UE is configured to perform at least one of a plurality of actions, including:
    (1) entering a state REGISTERED.LIMITED-SER-VICE and searching for a suitable cell,
    (2) entering a state REGISTERED.PLMN-SEARCH and applying a PLMN selection process, and
    (3) performing a local release of all packet data units (PDUs) or packet sessions associated with 3GPP access except for an emergency PDU or packet session and entering the state REGISTERED.LIM-ITED-SERVICE.

10. The apparatus of claim 9, wherein a second CAG ID of the one or more CAG ID is determined as being authorized based on the allowed CAG list when a second time period of a second time validity information of the second CAG ID of the one or more CAG ID matches a current time of the UE.

11. The apparatus of claim 9, wherein the UE determines whether the UE is configured to perform at least one of the actions based on one or more of:
    (a) whether the entry includes an indication that the UE is only allowed to access a fifth-generation system (5GS) or a sixth-generation system (6GS) via CAG cells,
    (b) whether the one or more CAG IDs are authorized based on the allowed CAG list, and
    (c) whether the UE has the emergency PDU or packet session.

12. The apparatus of claim 11, wherein the UE is configured to enter the state REGISTERED.LIMITED-SERVICE and search for a suitable cell when the entry does not include the indication that the UE is only allowed to access the 5GS or the 6GS via the CAG cells.

13. The apparatus of claim 11, wherein the UE is configured to enter the state REGISTERED.LIMITED-SERVICE and search for a suitable cell when the entry includes the indication that the UE is only allowed to access the 5GS or the 6GS via the CAG cells and at least one of the one or more CAG IDs are authorized based on the allowed CAG list.

14. The apparatus of claim 11, wherein the UE is configured to enter the state REGISTERED.PLMN-SEARCH and apply the PLMN selection process when the entry includes the indication that the UE is only allowed to access the 5GS or the 6GS via the CAG cells, none of the one or more CAG-IDs is authorized based on the allowed CAG list, and the UE does not have the emergency PDU or packet session.

15. The apparatus of claim 11, wherein the UE is configured to perform the local release of all PDU or packet sessions associated with 3GPP access except for the emergency PDU or packet session and enter the state REGIS-TERED.LIMITED-SERVICE when the entry includes the indication that the UE is only allowed to access the 5GS or the 6GS via the CAG cells, none of the one or more CAG-IDs is authorized based on the allowed CAG list, and the UE has the emergency PDU or packet session.

16. The apparatus of claim 9, wherein the entry further includes a PLMN identifier for identifying the current PLMN, wherein the first time validity information is configured as part of the first CAG ID in the allowed CAG list of the entry in the CAG information list, and the CAG information list including the first time validity information is stored in a non-volatile memory of the UE.

17. A non-transitory computer-readable medium storing computer executable code for wireless communication of a user equipment (UE), comprising code to:
    maintain a closed access group (CAG) information list including an entry, wherein the entry includes an allowed CAG list associated with a current public land mobile network (PLMN), the allowed CAG list includes one or more CAG identifiers (IDs), the one or more CAG IDs includes a first CAG ID configured with a first time validity information including a first time period, and each of the one or more CAG IDs is configured with a time validity information including a time period;
    access the current PLMN via a current CAG cell supporting the first CAG ID when the first CAG ID is determined as being authorized during the first time period based on the allowed CAG list;
    check whether the UE is authorized based on the first time validity information;

after the first time period of the first CAG ID, determine that none of the CAG IDs supported by the current CAG cell is currently authorized based on the allowed CAG list in response to an event that the UE becomes not authorized; and determine whether the UE is configured to perform at least one of a plurality of actions, including:

(1) entering a state REGISTERED.LIMITED-SER-VICE and searching for a suitable cell, (2) entering a state REGISTERED.PLMN-SEARCH and applying a PLMN selection process, and (3) performing a local release of all packet data units (PDUs) or packet sessions associated with 3GPP access except for an emergency PDU or packet session and entering the state REGISTERED.LIM-ITED-SERVICE.

18. The non-transitory computer-readable medium of claim 17, wherein a second CAG ID of the one or more CAG ID is determined as being authorized based on the allowed CAG list when a second time period of a second time validity information of the second CAG ID of the one or more CAG ID matches a current time of the UE.

19. The non-transitory computer-readable medium of claim 17, wherein the UE determines whether the UE is configured to perform at least one of the actions based on one or more of:

(a) whether the entry includes an indication that the UE is only allowed to access a fifth-generation system (5GS) or a sixth-generation system (6GS) via CAG cells, (b) whether the one or more CAG IDs are authorized based on the allowed CAG list, and (c) whether the UE has the emergency PDU or packet session.

20. The non-transitory computer-readable medium of claim 17, wherein the entry further includes a PLMN identifier for identifying the current PLMN, wherein the first time validity information is configured as part of the first CAG ID in the allowed CAG list of the entry in the CAG information list, and the CAG information list including the first time validity information is stored in a non-volatile memory of the UE.

\* \* \* \* \*